US010647933B2

(12) United States Patent
Marker et al.

(10) Patent No.: US 10,647,933 B2
(45) Date of Patent: May 12, 2020

(54) ACTIVATED CARBON AS A HIGH VALUE PRODUCT OF HYDROPYROLYSIS

(71) Applicant: GAS TECHNOLOGY INSTITUTE, Des Plaines, IL (US)

(72) Inventors: Terry L. Marker, Palos Heights, IL (US); Martin B. Linck, Roscoe, IL (US); Michael J. Roberts, Itasca, IL (US)

(73) Assignee: Gas Technology Institute, Des Plaines, IL (US)

( * ) Notice: Subject to any disclaimer, the term of this patent is extended or adjusted under 35 U.S.C. 154(b) by 0 days.

(21) Appl. No.: 14/940,024

(22) Filed: Nov. 12, 2015

(65) Prior Publication Data

US 2017/0137294 A1    May 18, 2017

(51) Int. Cl.

| | | |
|---|---|---|
| *C01B 31/10* | (2006.01) | |
| *C10L 1/08* | (2006.01) | |
| *C01B 3/34* | (2006.01) | |
| *C10L 1/06* | (2006.01) | |
| *C10G 1/06* | (2006.01) | |
| *C01B 32/30* | (2017.01) | |
| *C10G 3/00* | (2006.01) | |

(52) U.S. Cl.
CPC ............... *C10L 1/08* (2013.01); *C01B 3/34* (2013.01); *C01B 32/30* (2017.08); *C10G 1/06* (2013.01); *C10G 3/50* (2013.01); *C10L 1/06* (2013.01); *C01B 2203/043* (2013.01); *C01B 2203/0405* (2013.01); *C01B 2203/06* (2013.01); *C10L 2200/0423* (2013.01); *C10L 2200/0446* (2013.01); *Y02P 20/145* (2015.11); *Y02P 30/20* (2015.11)

(58) Field of Classification Search
CPC .................................................... C01B 32/30
See application file for complete search history.

(56) References Cited

U.S. PATENT DOCUMENTS

| | | |
|---|---|---|
| 3,625,664 A | 12/1971 | Padovani |
| 3,997,423 A | 12/1976 | Greene |
| 4,013,543 A | 3/1977 | Greene |
| 4,166,786 A | 9/1979 | Duraiswamy et al. |
| 4,252,736 A | 2/1981 | Haag et al. |
| 4,260,473 A | 4/1981 | Bauer |
| 4,326,944 A | 4/1982 | Meyer et al. |
| 4,371,727 A | 2/1983 | Gavin |
| 4,597,776 A | 7/1986 | Ullman et al. |
| 4,645,585 A | 2/1987 | White |
| 4,808,289 A | 2/1989 | McDaniel et al. |
| 4,822,935 A | 4/1989 | Scott |
| 5,055,181 A | 10/1991 | Maa et al. |
| 5,096,569 A | 3/1992 | Maa et al. |
| 5,605,551 A | 2/1997 | Scott et al. |
| 6,057,262 A * | 5/2000 | Derbyshire ........... C01B 32/342 502/423 |
| 6,132,597 A | 10/2000 | Harle et al. |
| 6,596,780 B2 | 7/2003 | Jahnke et al. |
| 6,669,822 B1 * | 12/2003 | Fujimura ................ C01B 31/08 201/20 |
| 6,991,578 B2 | 1/2006 | Ziemer |
| 7,018,319 B2 | 3/2006 | Ziemer |
| 7,115,061 B2 | 10/2006 | Tiesler et al. |
| 7,163,484 B2 | 1/2007 | Kiemen |
| 7,201,698 B2 | 4/2007 | Gumpoltsberger |
| 7,211,022 B2 | 5/2007 | Tiesler et al. |
| 7,511,181 B2 | 3/2009 | Petri et al. |
| 7,686,856 B2 | 3/2010 | Hemmings et al. |
| 7,982,076 B2 | 7/2011 | Marker et al. |
| 7,994,375 B2 | 8/2011 | Marker et al. |
| 8,003,834 B2 | 8/2011 | Marker et al. |
| 8,063,258 B2 | 11/2011 | Bartek et al. |
| 8,084,655 B2 | 12/2011 | Dindi et al. |
| 8,119,847 B2 | 2/2012 | Dindi et al. |
| 8,217,210 B2 | 7/2012 | Agrawal et al. |
| 8,309,052 B2 * | 11/2012 | Jones ..................... C01B 32/30 422/198 |
| 8,475,549 B2 | 7/2013 | Vogel et al. |

(Continued)

FOREIGN PATENT DOCUMENTS

| | | |
|---|---|---|
| CN | 1473188 A | 2/2004 |
| EP | 2141217 A1 | 1/2010 |

(Continued)

OTHER PUBLICATIONS

Sephton, M. A. et al., "Hydropyrolysis of High Molecular Weight Organic Matter in Murchison", Lunar and Planetary Science XXXIV, 2003.
Guell, A. J. et al., "Effect of H2-Pressure on the Structures of Bio-oils from the Mild Hydropyrolysis of Biomass", Biomass and Bioenergy, vol. 5., No. 2, pp. 155-171, 1993.
Rocha, J. Dilcio et al., "The Scope for Generating Bio-Oils with Relatively Low Oxygen Contents Via Hydropyrolysis", Organic Geochemistry, 30 (1999) 1527-1534.
Meier, D. et al., "Catalytic Hydroliquefaction of Spruce Wood—Elemental Balance and Effect of Catalyst", J Wood Chem Technology, vol. 8, No. 4, 1988 pp. 523-542.
Meier, D. et al. "Direct Catalytic Liquefaction Technology of Biomass Status and Review", Biomass Pyrolysis Liquids, 1991, pp. 93-102.

(Continued)

*Primary Examiner* — Stuart L Hendrickson
(74) *Attorney, Agent, or Firm* — Banner & Witcoff, Ltd.

(57) ABSTRACT

Hydropyrolysis processes that accompany the generation of activated carbon as an end product, as well as processes for the production of activated carbon from hydropyrolysis char, are described. Representative processes comprise upgrading, by steam activation, char that is formed from solid biomass-containing feedstocks and/or solid biomass derived feedstocks, such as lignocellulosic feedstocks (e.g., wood). Such processes are associated with a number of advantages in terms of achieving operating synergies, obtaining desirable intermediate material and end product properties, reducing environmental impact, and significantly improving economic attractiveness.

19 Claims, 1 Drawing Sheet

(56) References Cited

U.S. PATENT DOCUMENTS

| | | | |
|---|---|---|---|
| 8,492,600 B2* | 7/2013 | Marker | C01B 3/16 201/21 |
| 2003/0130360 A1 | 7/2003 | Kindig et al. | |
| 2006/0219403 A1 | 10/2006 | Steinberg | |
| 2006/0270513 A1 | 11/2006 | Kiemen | |
| 2006/0270516 A1 | 11/2006 | Kiemen | |
| 2007/0010588 A1 | 1/2007 | Pearson | |
| 2007/0119098 A1 | 5/2007 | Diaz et al. | |
| 2007/0225382 A1 | 9/2007 | Van Den Berg et al. | |
| 2008/0006519 A1 | 1/2008 | Badger | |
| 2008/0053870 A1 | 3/2008 | Marker et al. | |
| 2008/0115415 A1 | 5/2008 | Agrawal et al. | |
| 2008/0229653 A1 | 9/2008 | Iversen et al. | |
| 2008/0293537 A1 | 11/2008 | Phillips | |
| 2009/0082604 A1 | 3/2009 | Agrawal et al. | |
| 2009/0084666 A1 | 4/2009 | Agrawal et al. | |
| 2009/0126274 A1 | 5/2009 | Vogel et al. | |
| 2009/0163744 A1 | 6/2009 | Abhari et al. | |
| 2009/0299112 A1 | 12/2009 | Bauer et al. | |
| 2011/0219677 A1 | 9/2011 | Koyama et al. | |

FOREIGN PATENT DOCUMENTS

| | | |
|---|---|---|
| JP | S5981385 A | 5/1984 |
| JP | 2007-153928 A | 6/2007 |
| JP | 2012-308564 A | 11/2007 |
| JP | 2009509759 A | 3/2009 |
| JP | 2011-515539 A | 5/2011 |
| JP | 2011-526640 A | 10/2011 |
| RU | 2124547 C1 | 1/1999 |
| WO | 88/01611 A1 | 3/1988 |
| WO | 00/21911 A1 | 4/2000 |
| WO | 2009/029660 A2 | 3/2009 |
| WO | 2009/038965 A1 | 3/2009 |
| WO | 2009/117337 A2 | 9/2009 |
| WO | 2009124017 A2 | 10/2009 |
| WO | 2010058580 A1 | 5/2010 |
| WO | 2010117437 A1 | 10/2010 |

OTHER PUBLICATIONS

Meier, D. et al. "Effect of Hydrogen Pressure on Yields and Quality of Oils Obtained from Direct Liquefaction of Pine Wood", Energy From Biomass 4, 1989, pp. 584-592.

Meier D. et al., "High Liquid Yields from Lignin Via Catalytic Hydropyrolysis", Advances in Thermochemical Biomass Conversion, vol. 2, 1994, pp. 1016-1031.

Nikkhah, K. et al., "Co-pyrolysis of Various Biomass Materials and Coals", Energy from Biomass and Wastes, XVI, 1992, pp. 857-902.

Pindoria, R.V., et al., "A Two-Stage Fixed-Bed Reactor for Direct Hydrotreatment of Volatiles", Fuel, vol. 77, No. 15, Dec. 1998, pp. 1715-1726.

Scott, D.S., et al. "The Continuous Flash Pyrolysis of Biomass", Can J Chem Eng., vol. 62, No. 3, Jun. 1984, pp. 404-412.

Love, Gordon D. et al., "Release of covalently-bound alkane biomarkers in high yields from kerogen via catalytic hydropyrolysis", Org. Geochem., vol. 23, No. 10, pp. 981-986, 1995.

Oasmaa, et al. "Catalytic Hydrotreatment of Some Technical Lignins," Bioresource Technology (1993), vol. 45, pp. 189-194.

Meier et al. "Pyrolysis and Hydropyrolysis of Biomass and Lignins-Activities at the Institute of Wood Chemistry in Hamburg, Germany," Institute of Wood Chemistry and Chemical Technology of Wood (1996), pp. 298-303.

Elliott et al. "Catalytic Hydroprocessing of Biomass Fast Pyrolysis Bio-oil to Produce Hydrocarbon Products Environmental Progress and Sustainable Energy," Environmental Progress & Sustainable Energy (2009), vol. 28, No. 3, pp. 441-449.

Mohan et al. "Pyrolysis of Wood/Biomass for Bio-Oil: A Critical Review," Energy and Fuels (2006), vol. 20, pp. 848-889.

U.S. Appl. No. 12/815,743—Non-Final Office Action dated Jul. 2, 2013.

Russian Application No. 2011144858—Decision on Grant dated Jul. 28, 2014.

European Application No. 11796075.7—Supplementary European Search Report dated Apr. 2, 2014.

Chinese Patent Application No. 201180038507.0—Search Report dated Nov. 21, 2013.

Donald L. Klass, "Thermal Conversion: Pyrolysis and Liquefaction", Biomass for Renewable Energy, Fuels, and Chemicals, pp. 225-269.

J.D. Rocha, et al. "Hydrodeoxygenation of Oils from Cellulose in Single and Two-Stage Hydropyrolysis" Renewable Energy, vol. 9, pp. 950-953, 1996.

Ayse E. Putun, et al. "Oil Production from an arid-land plant: fixed-bed pyrolysis and hydropyrolysis of Euphorbia rigida", Fuel, vol. 75 No. 11, pp. 1307-1312, 1996.

E. Putun, et al.: "Effect of Mass Transfer and Hydrogen pressure on the Fixed Bed Pyrolysis of Sunflower Bagasse", 1997, http:/web.anl.gov/PCS/acsfuel/preprint%20archive/Files/Merge/Vol-39_4-0002.pdf.

Japanese Patent Application No. 2012-504670 dated Nov. 8, 2013.

* cited by examiner

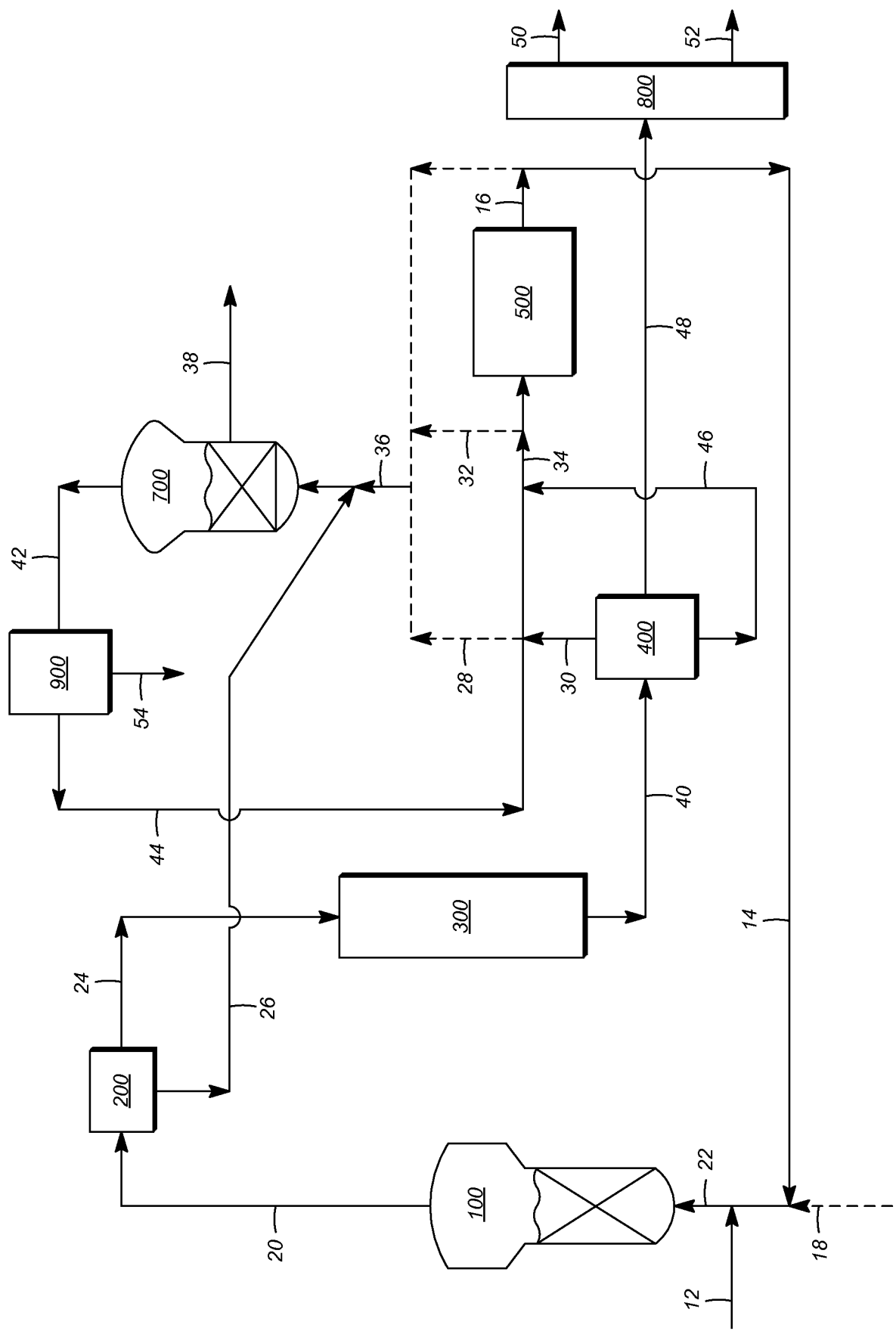

US 10,647,933 B2

ACTIVATED CARBON AS A HIGH VALUE PRODUCT OF HYDROPYROLYSIS

FIELD OF THE INVENTION

The disclosure is directed to improvements in the economics of processes in which a biomass-containing feedstock and/or a biomass-derived feedstock is subjected to hydropyrolysis, thereby generating solid char. Particular aspects relate to upgrading the solid char to activated carbon as a high value product.

BACKGROUND

Biomass refers to biological material derived from living or deceased organisms and includes lignocellulosic materials (e.g., wood), vegetable oils, carbohydrates (e.g., sugars), aquatic materials (e.g., algae, aquatic plants, and seaweed), and animal by-products and wastes (e.g., offal, fats, and sewage sludge). In the conventional pyrolysis of biomass, typically fast pyrolysis carried out in an inert atmosphere, a dense, acidic, reactive liquid bio-oil product is obtained, which contains water, oils, and char formed during the process. Much of the oxygen present in biomass ultimately resides in the bio-oil, thereby increasing its chemical reactivity.

Characteristic total acid numbers (TAN) of conventional bio-oil are in the range of 100-200, rendering it highly corrosive. Moreover, this product tends to undergo polymerization, is generally incompatible with petroleum hydrocarbons due to water miscibility and very high oxygen content (on the order of about 40% by weight), and has a low heating value. The unstable bio-oils of conventional pyrolysis tend to thicken over time and can also react to a point where hydrophilic and hydrophobic phases form. As a result, transportation and utilization of this product are problematic. Also, it is difficult to upgrade this product to a liquid hydrocarbon fuel, due to the retrograde reactions that typically occur in conventional pyrolysis processes, including fast pyrolysis. Dilution with methanol or other alcohols has been shown to reduce the activity and viscosity of the formed bio-oils, but this approach is not considered practical or economically viable, due to the large amounts of unrecoverable alcohol that are required to stabilize pyrolysis liquids. The removal of char, generated by conventional pyrolysis, from the pyrolysis product while it is still in the vapor phase presents an additional technical challenge.

Significant amounts of oxygen and free radicals in the pyrolysis vapors remain highly reactive and form a pitch-like material upon contact with char particles on the surface of a filter or other solid separator. Consequently, devices used to separate char from the hot pyrolysis vapors can become quickly plugged, due to the reactions of char and pyrolysis vapor constituents that occur on and within the layer of char on the surfaces of such devices, as well as within the pores of porous filter elements. Finally, it is noted that the upgrading of pyrolysis oils, using conventional hydroconversion processes, consumes large quantities of $H_2$, and extreme process conditions, including high hydrogen pressures needed to meet product quality requirements, make such processes uneconomical. The reactions are inherently out of balance in that, due to the high pressures required, too much water is created while too much $H_2$ is consumed. In addition, conventional hydroconversion reactors can rapidly develop high pressure differentials, due to reactive coke precursors present in the pyrolysis oils or from coke produced as a result of catalysis.

More recently, the use of hydrogen in biomass pyrolysis (i.e., hydropyrolysis) has been disclosed. For example, hydropyrolysis processes taught in U.S. Pat. No. 8,492,600 have been found to overcome a number of the drawbacks of conventional fast pyrolysis processes, including those described above, and have led to a number of other processing advantages. Despite these and other improvements, the art of hydropyrolysis is continually seeking further advancements in terms of process economics, as well as the overall carbon footprint associated with the production of biofuel end products, e.g., based on a lifecycle assessment of their greenhouse gas (GHG) emissions. Such advancements are of significant importance in establishing competitiveness, in terms of cost, product quality, and environmental impact, relative to conventional petroleum refining processes.

SUMMARY

Aspects of the present disclosure relate to the discovery of hydropyrolysis processes that are accompanied by the generation of activated carbon as an end product, and in particular by upgrading char that is formed from solid biomass-containing feedstocks and/or solid biomass derived feedstocks, such as lignocellulosic feedstocks (e.g., wood). More specifically, char is a solid carbonaceous residue that remains after the decomposition products of the feedstock (e.g., cellulose, hemicellulose, and/or lignin) are volatized and then at least partially deoxygenated, under the conditions of elevated hydrogen partial pressure and in the presence of a deoxygenating catalyst, existing in the hydropyrolysis reactor vessel. Activated carbon is a form of carbon that is processed (e.g., by steam activation) to have a significant pore volume, generally greater than 0.2 cubic centimeters per gram (cc/g), for pores within the meso- and micro-pore size ranges, namely those of less than 50 nanometers (nm) in diameter. This increased pore volume results in a high surface area, typically at least 300 square meters per gram ($m^2/g$), which renders the activated carbon suitable for a large number of adsorption and reactive adsorption applications, particularly in the fields of liquid and gas purification, for example in the processing of municipal drinking water as well as foods and beverages, odor removal, industrial pollution control, and filters for home use.

Importantly, the production of activated carbon as an end product of hydropyrolysis processes can benefit from operational efficiencies, due to the existence of needed materials and utilities (e.g., char, steam, and heat) already being present in process steams generated and/or already resulting from process steps practiced. As a practical matter, char separation and removal from the output of a hydropyrolysis reactor vessel is required whether or not it is further processed into activated carbon. This is not only to avoid contamination of the liquid hydrocarbon-containing end product fractions with solids, but also to prevent plugging of (or excessive pressure drop across) a fixed-bed hydroconversion reactor vessel, which may be located downstream of the hydropyrolysis reactor vessel, to promote further deoxygenation of the hydropyrolysis reactor output. Char separation, and its associated expense, have therefore conventionally been viewed as necessary to the operation of a hydropyrolysis process, with the separated char having an assumed value on the basis of its energy content, in a similar manner as coal valuation. Embodiments of the disclosure are directed to upgrading this separated char to activated carbon, and according to particular embodiments by using available steam and process heat, thereby significantly improving overall hydropyrolysis process economics. In this manner, activated carbon can be produced without the need for at least some, and possibly all, of the material and utility requirements of a conventional standalone process in which coal is subjected to steam activation.

Other aspects relate to the discovery that char produced under hydropyrolysis conditions ("hydropyrolysis char"), including elevated temperatures and hydrogen partial pressures, possesses properties that render it especially suitable in the production of activated carbon. Compared to coal, hydropyrolysis char has a significantly reduced content of heavy metals, such as mercury, and other non-combustible species that would otherwise degrade the high quality activated carbon end product. This advantageously overcomes the need to either mitigate these contaminants, or, alternatively, tolerate these contaminants at the expense of a loss in adsorptive capacity and/or increase in disposal costs. Moreover, conditions within a hydropyrolysis reactor vessel are sufficient to convert reactive, oxygenated hydrocarbon species (e.g., phenols) to hydrocarbons that are driven from (via volatilization) the hydropyrolysis char. This is in contrast to char products of conventional pyrolysis processes, which contain such reactive species, whereby char upgrading to activated carbon would require additional pre-treatment steps and/or suffer from an end product quality deficit, due a loss in active site capacity. Similarly, other volatile and soluble species are substantially absent from hydropyrolysis char, as a result of the hydropyrolysis process chemistry, thereby obviating additional removal steps, such as extraction.

In other aspects of the present disclosure, the upgrading of hydropyrolysis char involves its initial removal from the high temperature and high hydrogen partial pressure environment of the hydropyrolysis reactor vessel. The char may then be introduced into a separate steam activation vessel, for example operating with a bed of hydropyrolysis char particles that is fluidized with hot steam, as a fluidizing activation gas. The source of the steam may be all or a portion of a process stream already available in the hydropyrolysis process, such as a steam-containing feed to, or effluent from, a steam reformer that is used in the process for the generation of hydrogen from light hydrocarbons (e.g., methane, ethane, propane). In this manner, the required steam for activation is essentially provided as a "free" raw material stream. Likewise, the heat needed for maintaining activation temperatures of about 350° C. (662° F.) or more may be at least partially recovered from the heat generated in the hydropyrolysis reactor vessel and optional downstream hydroconversion reactor vessel, both of which operate exothermically as a result of the highly negative enthalpy associated with hydrodeoxygenation reactions. Moreover, the activation of char may be accompanied by the release of hydrogen, which, in addition to hydrogen produced from steam reforming, can be used for sustaining these reactions. Therefore, as is apparent to those skilled in the art consulting the present disclosure, the production of activated carbon as an end product of hydropyrolysis, in addition to one or more fractions comprising liquid hydrocarbons, involves a number of synergies that lead to favorable process economics.

Importantly, experimental studies have demonstrated that steam obtained from an intermediate stream of a hydropyrolysis process, together with the net heat released from the process (which would otherwise be considered waste heat), can both be used in the upgrading of char, having a representative surface area of less than 5 $m^2/g$, to activated carbon, having a representative surface area in the range from 450-500 $m^2/g$. In particular, this upgrading is accomplished by subjecting the hydropyrolysis char to steam activation conditions, including sufficient residence time and temperature, as described herein, to effect the desired transformations, including significant increases in both porosity and surface area. Following its removal from the steam activation vessel and separation from the activation effluent gas, the activated carbon product may be cooled and passivated to an extent that allows for its contact with air. Other modifications to the active sites of the end product, such as impregnation with inorganic alkaline materials, may also be performed. Steam may be condensed from the activation effluent gas, and a vapor fraction may be returned of the steam reformer described above.

Accordingly, particular embodiments of the invention are directed to hydropyrolysis processes, comprising feeding both (i) hydrogen and (ii) at least one of a biomass-containing feedstock or a biomass-derived feedstock, to a hydropyrolysis reactor vessel, under hydropyrolysis conditions for hydropyrolyzing the biomass-containing feedstock or the biomass-derived feedstock, and then withdrawing from the hydropyrolysis reactor vessel a hydropyrolysis reactor output comprising solid char particles, at least one non-condensable gas, and a partially deoxygenated hydropyrolysis product, for example in the form of a condensable vapor. The processes further comprise separating at least a portion of the solid char particles, as hydropyrolysis char, from the hydropyrolysis reactor output, and contacting the hydropyrolysis char with steam under conditions (e.g., temperature and residence time) to provide an activated carbon having a surface area of generally at least about 300 $m^2/g$, for example from about 350 $m^2/g$ to about 1500 $m^2/g$, typically at least about 400 $m^2/g$, for example from about 450 $m^2/g$ to about 1150 $m^2/g$, and often at least about 600 $m^2/g$, for example from about 650 $m^2/g$ to about 1000 $m^2/g$. The resulting surface area is influenced by the severity of the steam activation conditions, including temperature and residence time.

Other particular embodiments of the invention are directed to processes for producing activated carbon, the processes comprising contacting hydropyrolysis char (e.g., separated in from a hydropyrolysis reactor output, as described above) with steam. The contacting is performed under conditions that provide an activated carbon having a surface area in the ranges as described above. Advantageously, all or substantially all of the carbon in the hydropyrolysis char and activated carbon may be renewable carbon, for example, obtained from biomass. In addition, all or substantially all of the atomic oxygen content of the steam may likewise be obtained from biomass, following hydrodeoxygenation of biomass oxygen to $H_2O$. In this manner, activated carbon may be produced predominantly, if not completely (depending on the nature of the feedstock), from renewable sources of carbon and/or steam. Accordingly, the activated carbon may advantageously be obtained without adding to the carbon footprint of the higher value liquid products of hydropyrolysis, such as gasoline and/or diesel fuel fractions as hydrocarbon-containing biofuels described herein, based on a lifecycle assessment (LCA) of their greenhouse gas (GHG) emissions.

These and other aspects and embodiments relating to the invention, as well as their associated features and advantages, will be apparent from the following detailed description, in conjunction with the accompanying drawing.

BRIEF DESCRIPTION OF THE DRAWING

FIG. 1 is used to provide a more complete understanding of exemplary embodiments, without limiting the invention as defined by the appended claims.

FIG. 1 is a schematic flow diagram of a hydropyrolysis process that is integrated with the production of activated carbon as an end product, in addition to gasoline and diesel biofuels.

FIG. 1 is intended to present a simplified process flow scheme, in order to facilitate explanation and understanding of the illustrated processes and principles involved. Details including pumps, heaters, heat exchangers, valves, instrumentation, and others that are not essential to this explanation and understanding are not shown. However, (i) the manner of implementing such details, as well as (ii) configurations and components of alternative processes for providing hydroprocessed biofuels, according to other embodiments within the scope of the invention, will be recognized by those skilled in the art, having knowledge of the present disclosure.

DETAILED DESCRIPTION

Hydropyrolysis processes, as described herein, include a hydropyrolyzing step that occurs in a hydropyrolysis reactor vessel containing hydrogen and a deoxygenating catalyst. A representative hydropyrolyzing step is described, for example, in U.S. Pat. No. 8,492,600, which is incorporated herein by reference in its entirety. Hydropyrolysis involves, generally, feeding both hydrogen and a biomass-containing feedstock and/or a biomass-derived feedstock to a hydropyrolysis reactor vessel operating at elevated temperature and pressure in the presence of a fluidized bed of deoxygenating catalyst. The use of at least one solid biomass-containing feedstock and/or a solid biomass-derived feedstock, as described herein, leads to the formation of solid char, as a result of devolatilization in the hydropyrolysis reactor vessel, as well as other transformations of the feedstock that occur under the conditions of elevated temperature and hydrogen partial pressure.

According to embodiments described herein, the solid char is substantially separated from the hydropyrolysis output. The separated, solid char is contacted with steam to produce activated carbon, while the now substantially char free hydropyrolysis output is used to produce at least one liquid product, such as a hydropyrolysis bio-oil and/or one or more other "higher value liquids," which refer to liquid products having a greater value (e.g., on a weight basis) than the biomass-containing or biomass-derived feedstock, or combination thereof. Representative higher value liquids include individual compounds (e.g., levoglucosan), classes of compounds (e.g., aromatic hydrocarbons), and mixtures of compounds suitable for a particular purpose, such as gasoline or diesel fuel fractions (i.e., comprising a mixture of hydrocarbons in the gasoline boiling range or diesel fuel boiling range, respectively) that are suitable for use as transportation fuels or otherwise blending into such fuels.

A partially deoxygenated hydropyrolysis product may therefore be condensed from the hydropyrolysis reactor output to provide hydropyrolysis bio-oil. However, to the extent it may be desired to further deoxygenate this product (e.g., to increase the yield of hydrocarbons) the hydropyrolysis output, for example as a vapor phase stream obtained following the separation of the char, may be fed to a hydroconversion reactor vessel. In exemplary embodiments, the hydroconversion reactor vessel contains a fixed bed of hydroconversion catalyst suitable for providing, through additional hydrodeoxygenation in the presence of hydrogen, a substantially fully deoxygenated hydrocarbon liquid. According to such embodiments, in which the hydropyrolysis process involves integration between two reaction stages, namely occurring in a fluidized bed hydropyrolysis reactor vessel (first stage) and a downstream, fixed bed hydroconversion reactor vessel (second stage), further operational synergies in conjunction with the production of activated carbon may be exploited, as described in greater detail below.

Biomass-Containing and Biomass-Derived Feedstocks

"Biomass" refers to substances derived from organisms living above the earth's surface or within the earth's oceans, rivers, and/or lakes. Representative biomass can include any plant material, or mixture of plant materials, such as a hardwood (e.g., whitewood), a softwood, a hardwood or softwood bark, lignin, algae, and/or lemna (sea weeds). Energy crops, or otherwise agricultural residues (e.g., logging residues) or other types of plant wastes or plant-derived wastes, may also be used as plant materials. Specific exemplary plant materials include corn fiber, corn stover, and sugar cane bagasse, in addition to "on-purpose" energy crops such as switchgrass, miscanthus, and algae. Short rotation forestry products, such as energy crops, include alder, ash, southern beech, birch, eucalyptus, poplar, willow, paper mulberry, Australian Blackwood, sycamore, and varieties of paulownia elongate. Other examples of suitable biomass include vegetable oils, carbohydrates (e.g., sugars), organic waste materials, such as waste paper, construction, demolition wastes, and biosludge.

A "biomass-containing" feedstock may comprise all or substantially all biomass, but may also contain non-biological materials (e.g., materials derived from petroleum, such as plastics, or materials derived from minerals extracted from the earth, such as metals and metal oxides, including glass). An example of a "biomass-containing" feedstock that may comprise one or more non-biological materials is municipal solid waste (MSW).

"Biomass-derived," for example when used in the phrase "biomass-derived feedstock," refers to products resulting or obtained from the thermal and/or chemical transformation of biomass, as defined above, or biomass-containing feedstocks (e.g., MSW). Representative biomass-derived feedstocks therefore include, but are not limited to, products of pyrolysis (e.g., bio-oils), torrefaction (e.g., torrefied and optionally densified wood), hydrothermal carbonization (e.g., biomass that is pretreated and densified by acid hydrolysis in hot, compressed water), and polymerization (e.g., organic polymers derived from plant monomers). Other specific examples of biomass-derived products (e.g., for use as feedstocks) include black liquor, pure lignin, and lignin sulfonate. Biomass-derived feedstocks also extend to pretreated feedstocks that result or are obtained from thermal and/or chemical transformation, prior to, or upstream of, their use as feedstocks for a given conversion step (e.g., hydropyrolysis). Specific types of pretreating steps that result in biomass-derived products include those as described herein, and particularly those occurring in a pre-reactor, upstream of a hydropyrolysis reactor, and involving devolatilization and/or at least some hydropyrolysis of a biomass-containing feedstock. Therefore, certain pretreated feedstocks are also "biomass-derived" feedstocks, whereas other pretreated feedstocks, for example resulting or obtained from classification without thermal or chemical transformation, are "biomass-containing" feedstocks, but not "biomass-derived" feedstocks.

It is therefore also possible to feed to the hydropyrolysis reactor vessel, in place of all or a portion of the biomass-containing feedstock, a biomass-derived feedstock, such as a pretreated feedstock that is obtained from a biomass-containing feedstock, after having been devolatilized and/or partially hydropyrolyzed in a pretreating reactor (pre-reactor), upstream of the hydropyrolysis reactor vessel, as described herein. Such pre-reactor thermal and/or chemical transformations of biomass may be accompanied by other, supplemental transformations, for example to reduce corrosive species content, reduce hydropyrolysis catalyst poison content (e.g., reduced sodium), and/or a reduce hydroconversion catalyst poison content. Devolatilization and/or partial hydropyrolysis of biomass or a biomass-containing feedstock in a pre-reactor may be carried out in the presence of a suitable solid bed material, for example a pretreating catalyst, a sorbent, a heat transfer medium, and mixtures thereof, to aid in effecting such supplemental transformations and thereby improve the quality of the pretreated feedstock. Suitable solid bed materials include those having dual or multiple functions. In the case of a pretreating catalyst, those having activity for hydroprocessing of the biomass-containing feedstock, described below, are representative.

It is also possible to feed a biomass-containing feedstock that is a pretreated feedstock, obtained after having been subjected to a pretreating step, for example a physical classification to improve at least one characteristic, such as a reduced non-biological material content (e.g., content of glass, metals, and metallic oxides, including all mineral forms), a reduced average particle size, a reduced average particle aerodynamic diameter, an increased average particle surface area to mass ratio, or a more uniform particle size.

Suitable pre-treating steps, which may be used to provide a biomass-containing feedstock or a biomass-derived feedstock, include those described in co-pending U.S. patent application Ser. No. 14/321,147, and such pre-treating steps are hereby incorporated herein by reference in its entirety.

Deoxygenation Catalysts and Hydroconversion Catalysts

As described above, partial deoxygenation of compounds volatilized from biomass (e.g., cellulose, hemicellulose, and/or lignin) may be achieved in the hydropyrolysis reactor vessel in the presence of a deoxygenation catalyst, whereas substantially complete deoxygenation of the partially deoxygenated hydropyrolysis product may be achieved in a downstream hydroconversion reactor in the presence of a hydroconversion catalyst.

Suitable catalysts for use in the hydropyrolysis reactor vessel, and/or a hydroconversion reactor vessel (if used) will in general have activity for hydroprocessing of the biomass-containing feedstock and/or biomass-derived feedstock (e.g., a pretreated feedstock), and/or their hydropyrolysis reaction products, in an environment of suitable hydrogen partial pressure, temperature, and other conditions as described herein. Hydroprocessing is meant to encompass broadly a number of possible reactions, including hydrotreating, hydrocracking, hydroisomerization, and combinations thereof, occurring in a hydrogen-rich environment. Representative hydroprocessing catalysts include those comprising at least one Group VIII metal, such as iron, cobalt, and nickel (e.g., cobalt and/or nickel) and at least one Group VI metal, such as molybdenum and tungsten, on a high surface area support material such as a refractory inorganic oxide (e.g., silica, alumina, titania, and/or zirconia). A carbon support may also be used.

A representative catalyst having hydroprocessing activity therefore comprises a metal selected from the group consisting of nickel, cobalt, tungsten, molybdenum, and mixtures thereof (e.g., a mixture of nickel and molybdenum), deposited on any of these support materials, or combinations of support materials. Representative hydrocracking catalysts include those described in U.S. Pat. Nos. 5,292,702; 5,681,787; 6,077,807; and 6,093,309, assigned to CRI International, Inc. and incorporated by reference herein with respect to their disclosures of these catalysts.

Hydropyrolysis Processes Including the Co-Production of Activated Carbon

According to the embodiment of FIG. 1, a representative hydropyrolysis process comprises feeding hydrogen either together with, or separately from, biomass-containing and/or biomass-derived feedstock 12 to hydropyrolysis reactor vessel 100. The hydrogen may be fed, for example as recycled reformer effluent 14, optionally following a purification (not shown) of steam reformer effluent 16 to increase its hydrogen concentration. Methods for carrying out such a purification include membrane separations as well as adsorptive separations, such as pressure swing adsorption (PSA) and temperature swing adsorption (TSA). Hydrogen fed to hydropyrolysis reactor vessel 100 may also include make-up hydrogen 18, although this stream is not required in cases where hydrogen generated in reformer 500 and/or steam activation vessel 700 is sufficient to satisfy the hydrogen consumption demands of hydropyrolysis reactor vessel 100 and optionally hydroconversion reactor vessel 300.

Hydropyrolysis reactor vessel 100 may contain a fluidized bed, including the deoxygenating catalyst. Fluidization conditions in hydropyrolysis reactor vessel 100 may be suitably maintained such that intact catalyst particles are not entrained, whereas particles of solid feedstock become entrained once they are sufficiently devolatilized and reduced in hydrodynamic diameter, to an extent whereby the superficial velocity of fluidizing gas 22 in hydropyrolysis reactor vessel 100, comprising recycled reformer effluent 14 (which may be a hydrogen-enriched portion of steam reformer effluent 16) is sufficient to entrain the feedstock particles. That is, fluidization conditions may be tailored to achieve entrainment of feedstock particles following their conversion to solid hydropyrolysis char particles. Representative superficial gas velocities for the fluidizing gas 22 range generally from about 0.03 meters/second (m/s) to about 6 m/s, typically from about 0.15 m/s to about 3 m/s, and often from about 0.3 m/s to about 1.5 m/s. Often, it is desired to maintain the particle bed within hydropyrolysis reactor vessel 100 in the regime of bubbling fluidization, with the inclusion of reactor internal structures that hinder the transition to slugging fluidization. Representative internal structures for this purpose are described in U.S. Pat. No.8,841,495, hereby incorporated by reference in its entirety.

In many cases, hydropyrolysis reactor output 20 will comprise, as non-condensable gases, one or more of $H_2$, CO, $CO_2$, $CH_4$, $C_2H_6$, and $C_2H_4$. However, depending on the methanation activity and water-gas shift conversion activity of the deoxygenating catalyst, more or less methane ($CH_4$) will be produced at the expense of CO, $CO_2$, and $H_2$. In highly methanating environments, it may be possible for hydropyrolysis reactor output 20 to comprise little or no CO and/or $CO_2$ as non-condensable gases (e.g., in an amount of less than 5 vol-%, or even less than 1 vol-%, of all non-condensable gases) but nevertheless still comprise one or more of $H_2$, $CH_4$, $C_2H_6$, and $C_2H_4$. In general, therefore, hydropyrolysis reactor output 20 will comprise (i) $CO_2$, CO and other non-condensable or low molecular weight gases (e.g., $C_1$-$C_3$ hydrocarbon gases, including both paraffinic and olefinic hydrocarbons), together with any stoichiometric excess of $H_2$ that is not consumed in hydropyrolysis reactor vessel 100, (ii) a partially deoxygenated hydropyrolysis product (e.g., in the form of a condensable vapor), and (iii) solid char particles.

As used herein, the "partially deoxygenated hydropyrolysis product" of hydropyrolysis may comprise oxygenated hydrocarbons (e.g., derived from cellulose, hemicellulose, and/or lignin) that may be subjected to more complete deoxygenation (e.g., to produce hydrocarbons and remove the oxygen in the form of CO, $CO_2$, and/or water) in a subsequent hydroconversion step, for example in downstream hydroconversion reactor vessel 300. The term "partially deoxygenated hydropyrolysis product," however, does not preclude the presence of some amount of hydrocarbons (e.g., aromatic hydrocarbons such as alkylbenzenes) that are fully deoxygenated and thus cannot be further deoxygenated. The partially deoxygenated hydropyrolysis product, according to some embodiments, will generally contain a lower oxygen content compared to conventional bio-oils obtained from pyrolysis in the substantial absence of any deoxygenation reactions. This is due to the extent of catalytic deoxygenation reactions occurring within hydropyrolysis reactor vessel 100 in the presence of hydrogen. Representative oxygen contents of the partially deoxygenated hydropyrolysis product are generally in the range from about 2% to about 30% by weight, and typically in the range from about 5% to about 25% by weight.

Hydropyrolysis reactor output 20 may therefore be withdrawn from hydropyrolysis reactor vessel 100 as a vapor stream having solid char particles entrained therein. Following hydropyrolysis, representative processes may further comprise removing, for example using char removal system 200 comprising a suitable gas-solid separation device, all or substantially all of the char particles and/or other solid particles (e.g., catalyst fines) from hydropyrolysis reactor output 20 to provide hydropyrolysis reactor vapor 24 having a reduced char content. The removal of hydropyrolysis char 26 may be particularly important in processes in which a product of hydropyrolysis, including hydropyrolysis reactor vapor 24 or a portion thereof, is further processed in a hydroconversion zone containing at least one fixed bed catalytic hydroconversion reactor, such as hydroconversion reactor vessel 300 shown in FIG. 1, to achieve more complete deoxygenation. In such cases, the removal of fine char particles prevents problems associated with premature plugging of the hydroconversion reactor, as the char particles become trapped within the voids of the fixed catalyst bed.

At least a portion, but often all or substantially all, of the solid char particles in hydropyrolysis reactor output 20 are separated out as hydropyrolysis char 26. As defined herein, the removal of substantially all of the char particles means that at least 99% by weight of the char particles in hydropyrolysis reactor output 20 are excluded from hydropyrolysis reactor vapor 24. According to further embodiments, at 99.9% by weight, or at least 99.99% by weight, of the char particles are excluded. Suitable mechanical gas-solid separation devices for achieving such levels of separation include filters, cyclone separators, and electrostatic precipitators. If necessary, a secondary mechanical solid-solid separation device, e.g., based on centrifugation or entrainment, may be used to perform a secondary separation of any catalyst fines remaining in hydropyrolysis char 26. Otherwise, a secondary mechanical gas-solid separation may be performed (e.g., downstream of char removal system) to remove very small catalyst fines, such as catalyst dust escaping char removal system 200, from hydropyrolysis reactor vapor 24.

In the production of activated carbon, hydropyrolysis char 26 may be contacted with a source of steam available in the integrated hydropyrolysis process, for example any of (i) hydroconversion gaseous mixture portion 28 (i.e., a gas stream comprising at least a portion of hydroconversion gaseous mixture 30), (ii) steam reformer combined feed portion 32 (i.e., a gas stream comprising at least a portion of steam reformer effluent combined feed 34), and/or (iii) steam reformer effluent portion 36 (i.e., a gas stream comprising at least a portion of steam reformer effluent 16). Any of these steam-containing streams, and optionally makeup steam (not shown in FIG. 1), may be passed to steam activation vessel 700, to ensure that steam is present in gas entering this vessel, for example fluidizing activation gas 36 as shown in FIG. 1. Fluidizing activation gas 36 may be used to entrain the particulate solids of hydropyrolysis char 26, under conditions of sufficient gas superficial velocity, such that these solids may be introduced from below to steam activation vessel 700. Within this vessel 700, fluidizing activation gas 36 and hydropyrolysis char 26 may be contacted under conditions of suitable temperature and residence time to yield highly porous, high surface area activated carbon 38. Representative activation temperatures are generally at least about 350° C. (662° F.) (e.g., from about 350° C. (662° F.) to about 1150° C. (2102° F.)) and often at least about 500° C. (932° F.) (e.g., from about 500° C. (932° F.) to about 1000° C. (1832° F.)). Representative activation residence times are generally at least about 15 minutes (e.g., from about 15 minutes to about 10 hours), typically at least about 30 minutes (e.g., from about 30 minutes to about 5 hours), and often at least about 1 hour (e.g., from about 1 hour to about 4 hours). The control of residence time of hydropyrolysis char, during its conversion to activated carbon, may be improved by including inert solids having a uniform, specific geometry (e.g., refractory spheres having a specific diameter) and density, within steam activation vessel 700. The uniformity of such inert solids may act to stabilize the fluidization of a fluidized bed of hydropyrolysis char, in combination with such inert solids.

Whereas the quality of activated carbon 38 is governed primarily by the characteristics of hydropyrolysis char 26 and conditions of temperature and residence time within steam activation vessel 700, it is not necessary to fluidize the hydropyrolysis char in this vessel. While fluidized beds are often preferable for promoting uniform temperatures and flow distribution, steam activation may also be performed with a fixed bed of hydropyrolysis char or using another known method for carrying out gas-solid contacting. Steam activation may be performed batchwise, for example, with the continuous input and withdrawal of steam-containing activation gas and the batchwise input of solid char and batchwise withdrawal of activated carbon, such that the char/gas contacting time (or time between the input and withdrawal of the batches of solid particles) is according to the residence times described above. Otherwise, activation may be performed continuously, for example, with the continuous input and withdrawal of both gases and solids, such that the average the char/gas contacting time is according to the residence times described above. In either case, following the removal of activated carbon product from steam activation vessel 700, passivation steps may be performed to minimize and/or eliminate the ability of the activated carbon product to self-heat in the presence of ambient air. Also, during steam activation, physiochemical activating agents may be added to increase activity of the resulting product and/or introduce desired chemical functional groups. Representative activating agents include alkali and alkaline earth metal hydroxides, organic amines, chlorides (including hydrochloric acid), nitrates (including nitric acid), and sulfates (including sulfuric acid).

In one example, a continuous circulating loop of hydropyrolysis char may be established (e.g., as part of a circulating fluidized bed steam activation process), with disengagement of the activation effluent gas at the top of the loop and the return of solids in an internal or external downcomer loop. In this case, the average residence time may be governed by the withdrawal rate of solid, activated carbon product. In the case of a steam activation being performed using a fluidized bed, whether in a bubbless, bubbling, turbulent, circulating, or other regime, the superficial velocity of fluidizing activation gas 36 should be consistent with the objectives of the fluidization regime, considering the properties of the hydropyrolysis char, conditions within the activation vessel, and the particular fluidizing activation gas used. In general, a steam-containing fluidizing activation gas will have a superficial velocity of generally greater than about 0.05 meters per second (m/s) (e.g., from about 0.05 m/s to about 2.5 m/s), typically greater than about 0.15 m/s (e.g., from about 0.15 m/s to about 2.0 m/s), and often greater than about 0.25 m/s (e.g., from about 0.25 m/s to about 1.5 m/s).

According to the embodiment of FIG. 1, representative processes may further comprise feeding hydropyrolysis reactor vapor 24, obtained from hydropyrolysis reactor output 20 following the separation of hydropyrolysis char 26, to a hydroconversion zone as described above. The hydroconversion zone may include hydroconversion reactor vessel 300 for hydroconverting at least a portion of hydropyrolysis reactor vapor 24, generally in the presence of hydrogen and a hydroconversion catalyst, to obtain hydroconversion zone output 40. Hydropyrolysis reactor vapor 24, like hydropyrolysis reactor output 20, may include condensable gases (e.g., water vapor; $C_3H_8$, $C_3H_6$, and higher molecular weight hydrocarbons; and oxygenated hydrocarbons such as phenols) as well as non-condensable gases (e.g., $H_2$, CO, $CO_2$, $CH_4$, $C_2H_{65}$ and $C_2H_4$). Generally, hydropyrolysis reactor vapor 24, or at least a portion thereof, will be passed completely in the vapor phase to the subsequent hydroconverting step, without intermediate condensing of any portion of this stream. However, intermediate condensing with re-heating may also be possible, for example, to selectively condense unwanted components of relatively low volatility (relatively high boiling point), thereby optionally providing a liquid condensate "wash" to aid in the removal of char and/or other solid particles (e.g., catalyst fines). In other embodiments, hydropyrolysis reactor vapor 24 may be partially condensed and passed as a mixed vapor and liquid phase to the subsequent hydroconverting step. Partial condensation may occur, for example, when heat is recovered from hydropyrolysis reactor vapor 24 (e.g., by heat exchange with a cooler stream), or when heat is otherwise lost to the environment.

As is apparent from the above description, all or a portion of hydropyrolysis reactor vapor 24 exiting the hydropyrolysis reactor (and obtained following the substantial removal of all char particles) may be subjected to the subsequent hydroconverting step. Between the steps of hydropyrolyzing and hydroconverting, therefore, hydropyrolysis reactor vapor 24 may, by separation or reaction, be enriched with respect to one or more desired components and/or depleted with respect to one or more undesired components. Hydropyrolysis reactor vapor 24 may also be mixed prior to or during the hydroconverting step with one or more additional streams. Accordingly, unless otherwise noted, the step of hydroconverting at least a portion of the hydropyrolysis reactor vapor 24 is meant to encompass such intermediate steps as separation, reaction, and/or mixing. In some embodiments, however, the hydropyrolysis reactor vapor 24, or portion thereof, may be subjected to the hydroconverting step, without an intermediate step of being enriched with respect to one or more desired components and/or depleted with respect to one or more undesired components, by separation or reaction (e.g., in the case of partial condensation, which may serve to remove some of the solid particles). For example, a portion of the hydropyrolysis reactor vapor 24 may be split from the entire effluent of the hydropyrolysis reactor (following the substantial removal of all char particles), with little or no change in its composition. Likewise, the purified hydropyrolysis reactor vapor, or portion thereof, may be subjected to the hydroconverting step, without being mixed prior to or during the hydroconverting step with one or more additional streams. However, in many cases it will be desirable to mix the hydropyrolysis reactor vapor 24 or portion thereof with hydrogen or a hydrogen-containing gas stream that provides additional hydrogen (i.e., beyond that contained in the hydropyrolysis reactor vapor 24 or portion thereof) for hydroconversion as described below.

A suitable hydrogen-containing gas stream, for example, is an activation effluent gas withdrawn from a steam activation vessel as described above, and/or a steam-depleted activation effluent vapor fraction. Both of these gas streams, downstream of a steam activation vessel used to produce activated carbon, may contain hydrogen liberated from the activation of hydropyrolysis char. Whereas FIG. 1 depicts both activation effluent gas 42 withdrawn from a steam activation vessel 700 and steam-depleted activation effluent vapor fraction 44, the latter stream in the depicted embodiment is directed, together with hydroconversion gaseous mixture 30 and condensed aqueous phase 46, back to steam reformer 500, optionally following the removal of portion 32 of steam reformer effluent combined feed 34, with this portion 32 being a source of steam that is passed to steam activation vessel 700. Thus, the mixing of hydropyrolysis reactor vapor 24 with (i) an activation effluent gas withdrawn from a steam activation vessel and/or (ii) a steam-depleted activation effluent vapor fraction represent alternative embodiments not shown in FIG. 1. More generally, hydrogen fed to the hydropyrolysis reactor vessel, or otherwise a separate source of hydrogen fed to a hydroconversion reactor vessel, may include hydrogen in either an activation effluent gas or a steam-depleted activation effluent vapor fraction, as described herein.

According to the embodiment of FIG. 1, activation effluent gas 42 is withdrawn from steam activation vessel 700, and this gas stream may be enriched in hydrogen and/or depleted in steam, relative to fluidizing activation gas 36. The remaining steam in activation effluent gas 42, or portion thereof, may be condensed in cooler 900, with the optional recovery of heat and/or electric power. This may then provide, in addition to condensate 54, steam-depleted activation effluent vapor fraction 44, which may comprise methane and other hydrocarbons liberated from the steam activation of hydropyrolysis char 26 in steam activation vessel 700. In view of the possibility for generating additional hydrogen from these liberated hydrocarbons, steam-depleted activation effluent vapor fraction 44 may then be fed to steam reformer 500, such that at least a portion of the net production of hydrogen via steam reforming is obtained by reforming of these liberated hydrocarbons (e.g., methane). In addition, condensate 54 may be re-used in, i.e., returned to, steam reformer 500.

As described above, steam reformer effluent 16, or a portion thereof, may be enriched in hydrogen (e.g., by selective removal of CO$_2$ and/or other gases) using additional separation equipment (not shown in FIG. 1), for example a membrane separation unit, a pressure swing adsorption (PSA) unit, or a temperature swing adsorption (TSA) unit, to provide a high purity hydrogen-containing gas stream for recycle to the hydropyrolysis process, for example as recycled reformer effluent 14. Likewise, all or a portion of hydroconversion gaseous mixture 30 may also be purified using similar types of equipment, to provide a hydrogen-enriched recycle gas stream for feeding back to the hydropyrolysis reactor vessel or a hydroconversion reactor vessel. Any of the above separation units will necessarily produce tail gas streams (e.g., a reformer effluent tail gas stream or a separation zone tail gas stream) that are enriched, relative to the feeds to such separation units, in components other than hydrogen (e.g., CO and/or CO$_2$). Such tail gas streams may be sent for combustion to recover their heating value.

Representative processes may further comprise recovering substantially fully deoxygenated hydrocarbon liquid 48 and hydroconversion gaseous mixture 30 from the hydroconversion zone output 40. In this regard, the hydroconversion zone output 40 may comprise condensable gases from which the substantially fully deoxygenated hydrocarbon liquid 48 (which may include one, or a mixture of, substantially fully deoxygenated higher value liquid products) may be condensed and then separated using one or more separation processes including phase separation from a condensed aqueous phase 46 and/or distillation. For example, phase separation may be used to recover substantially fully deoxygenated hydrocarbon liquid 48, by separating it from condensed aqueous phase 46 comprising primarily condensed water. Fractionation (e.g., distillation) of substantially fully deoxygenated hydrocarbon liquid 48 may then be performed, for example in distillation column 800, to obtain substantially fully deoxygenated higheri value liquid products such as gasoline fraction 50, comprising gasoline boiling-range hydrocarbons and/or diesel fuel fraction 52, comprising diesel fuel boiling-range hydrocarbon fractions. Gasoline boiling range hydrocarbons are generally those having normal boiling points generally in the range from about 30° C. (86° F.) to about 149° C. (300° F.), and typically in the range from about 35° C. (95° F.) to about 130° C. (266° F.). Diesel boiling range hydrocarbons are generally those having normal boiling points generally in the range from about 120° C. (248° F.) to about 400° C. (752° F.), and typically in the range from about 149° C. (300° F.) to about 370° C. (698° F.).

The designation of "substantially fully deoxygenated" in reference to hydrocarbon liquids, as well as higher value liquid products that may be obtained from these liquids (e.g., by fractionation), can refer to a total oxygen content of less than about 2% by weight, less than about 1% by weight, less than about 5000 ppm by weight, less than about 2000 ppm by weight, or even less than about 1000 ppm by weight. The low oxygen content renders substantially fully deoxygenated hydrocarbon liquid 48 easily phase separable from condensed aqueous phase 46. Advantageously, any net condensed water produced according to integrated hydropyrolysis processes described herein will have a low content of dissolved total organic carbon (TOC), generally less than about 5000 wt-ppm, typically less than about 2000 wt-ppm, and often less than about 500 wt-ppm.

According to the embodiment of FIG. 1, hydroconversion gaseous mixture 30 that is recovered from the hydroconversion zone output 40 will generally include non-condensable gases (e.g., H$_2$, CO, CO$_2$, CH$_4$, C$_2$H$_6$, and C$_2$H$_4$) and optionally a minor amount of condensable gases (e.g., C$_3$ and heavier hydrocarbons), depending on the conditions (i.e., temperature and pressure) under which hydroconversion gaseous mixture 30 is separated in separation zone 400, using, for example, a gas-liquid separator or a stripper to achieve one or more theoretical equilibrium liquid-vapor separation stages. To the extent that hydroconversion gaseous mixture 30 contains CO, CO$_2$, and hydrocarbons, at least a portion thereof may be introduced to steam reformer 500, in order to provide a net production of hydrogen, together with unconsumed steam, in steam reformer effluent 16. Steam reformer 500 thereby beneficially produces reformed hydrogen that may be recycled to the hydropyrolysis process to satisfy some or all of the hydrogen requirements of the process and, for example the specific requirements of hydropyrolysis reactor vessel 100 and/or hydroconversion reactor vessel 300.

Accordingly, at least a portion of the hydrogen requirement of the hydropyrolysis process maybe satisfied by hydrogen that is (i) liberated by steam activation in the production of activated carbon from hydropyrolysis char or (ii) generated as a result of reforming hydrocarbons that are liberated in this production. Therefore, in view of the present disclosure, it is apparent that activated carbon can be produced in a manner that results in important synergies in integrated hydropyrolysis processes.

Moreover, due to the significant extent of deoxygenation in the hydropyrolysis reactor vessel and optional hydroconversion reactor vessel, the associated hydropyrolyzing and hydroconverting steps are normally both exothermic, i.e., the reactions associated with these steps involve a net generation of heat, despite the pyrolysis reactions in isolation being endothermic. Consequently, these process steps can be considered net exothermic process steps resulting in the generation of both hydropyrolysis reaction heat and hydroconversion reaction heat. Advantageously, at least a portion of the hydropyrolysis reaction heat and/or the hydroconversion reaction heat can be used to at least partially satisfy, and in some cases completely satisfy (i.e., without a supplemental source of heat), the heat requirement of steam activation vessel 700 for producing activated carbon. The heat requirement may be satisfied in some embodiments, for example, by both hydropyrolysis reaction heat and hydroconversion reaction heat. In addition, steam present in any of the available process streams that are fed to steam activation vessel 700, namely (i) hydroconversion gaseous mixture portion 28, (ii) steam reformer combined feed portion 32, and/or (iii) steam reformer effluent portion 36, (the last of these containing unconsumed steam in the reformer effluent), may be used to satisfy some or all of a steam requirement (e.g., without the need for a supplemental source of steam) for providing the activated carbon.

Therefore, in view of the present disclosure, it can be appreciated that activated carbon may be co-produced as an end product of a hydropyrolysis process, together with substantially fully deoxygenated hydrocarbon liquids containing biofuel fractions. Such co-production not only utilizes material streams and heat that already exist in the process, but also generates valuable hydrogen to satisfy the process requirements. All of these factors lead to processing efficiencies and, importantly, allow for the co-production of activated carbon without any substantial addition to the carbon footprint of the biofuel fractions, or higher value liquid products (such as gasoline boiling-range hydrocarbon-containing fractions and/or diesel fuel boiling-range hydrocarbon-containing fractions, obtained from the process), based on a lifecycle assessment of the greenhouse gas (GHG) emission value, according to U.S. government accounting practices. For purposes of this disclosure, the lifecycle greenhouse gas emission value may be measured based on $CO_2$ equivalents (e.g., grams (g) of $CO_2$-equivalents/megajoule (MJ) of energy or pounds (lb.) of $CO_2$ equivalents/million BTU (mmBTU of energy, wherein 1 g $CO_2$-eq./MJ is about 2.33 lb. $CO_2$-eq./mmBTU), as measured according to guidelines set forth by the Intergovernmental Panel on Climate Change (IPCC) and the U.S. federal government. Lifecycle assessment (LCA) values of emissions in terms of $CO_2$ equivalents, from raw material cultivation (in the case of plant materials) or raw material extraction (in the case of fossil fuels) through fuel combustion, can be calculated using SimaPro 7.1 software and IPCC GWP 100a methodologies.

Representative Operating Conditions

Conditions in the hydropyrolysis reactor vessel include a temperature generally from about 300° C. (572° F.) to about 600° C. (1112° F.), typically from about 400° C. (752° F.) to about 500° C. (932° F.), and often from about 410° C. (770° F.) to about 475° C. (887° F.). The weight hourly space velocity (WHSV) of the hydropyrolysis reactor vessel, calculated as the mass flow rate of the biomass-containing feedstock and/or biomass-derived feedstock divided by the catalyst inventory of the hydropyrolysis reactor vessel, is generally from about 0.1 $hr^{-1}$ to about 10 $hr^{-1}$, typically from about 0.5 $hr^{-1}$, to about 5 $hr^{-1}$, and often from about 0.8 $hr^{-1}$ to about 2 $hr^{-1}$, Conditions in the hydroconversion reactor vessel (or any of possibly two or more hydroconversion reactors, if used in a given hydroconversion zone) include a temperature generally from about 200° C. (392° F.) to about 475° C. (887° F.), typically from about 260° C. (500° F.) to about 450° C. (842° F.), and often from about 315° C. (599° F.) to about 430° C. (806° F.). The weight hourly space velocity (WHSV) of the hydroconversion reactor, calculated as the mass flow rate of the feed to the hydroconversion reactor vessel (e.g., a purified vapor stream obtained from the hydropyrolysis reactor) divided by the catalyst inventory of the hydroconversion reactor vessel, is generally from about 0.01 $hr^{-1}$ to about 5 $hr^{-1}$, typically from about 0.05 $hr^{-1}$ to about 5 $hr^{-1}$, and often from about 0.1 $hr^{-1}$ to about 4 $hr^{-1}$.

Further representative operating conditions for hydropyrolysis and hydroconversion and their significance are described in greater detail below. Some representative conditions are also described in U.S. patent application publication nos. US 2010/0251600, US 2010/0256428, and US 2013/0338412, the contents of which are hereby incorporated by reference in their entireties.

As described in these publications, catalysts and operating conditions in both the hydropyrolysis and hydroconversion reactor vessels may be adjusted such that the deoxygenation reactions, which remove oxygen from biomass-derived molecules (e.g., cellulose, hemicellulose, and/or lignin), are balanced between hydrodeoxygenation, which yields $H_2O$, and the non-condensable gas-yielding reactions of decarbonylation and decarboxylation, which yield CO and $CO_2$, respectively. Advantageously, the production of a significant amount of these gases from biomass oxygen in turn allows for their subsequent use, in reforming of gaseous mixtures (e.g., from the hydropyrolysis reactor output and/or a hydroconversion reactor output) in which they are contained (e.g., together with light hydrocarbons), to generate some or all of the hydrogen required in the integrated process.

According to representative embodiments, at least about 20% of the oxygen content of the biomass-containing feedstock, the biomass-derived feedstock, or both (in the case of both types of feedstock being used) is converted to CO and $CO_2$ following hydropyrolysis and hydroconversion. Representative ranges of conversion of the oxygen content of the biomass-containing feedstock to CO and $CO_2$ following these steps are from about 20% to about 80%, from about 30% to about 70%, and from about 40% to about 60%, in order to achieve a proper balancing between hydrodeoxygenation and decarbonylation/decarboxylation, as described above. Representative ranges of conversion of this oxygen content to $H_2O$ following these steps are at most about 80%, from about 20% to about 80%, from about 30% to about 70%, and from about 40% to about 60%. These ranges of feedstock oxygen content being converted following hydropyrolysis and hydroconversion are not necessarily representative of the final disposition of biomass oxygen content following downstream conversion by steam reforming, in which the $H_2O$ formed in hydropyrolysis and/or hydroconversion may be consumed. According to some embodiments, the final disposition of feedstock oxygen content to CO and $CO_2$, following steam reforming, may be significantly higher. For example, according to some embodiments in which the process is integrated with steam reforming, at least about 90%, and in some cases at least about 95%, of the feedstock oxygen content may be used to form CO and/or $CO_2$. It should also be noted, however, that, according to other embodiments, methanation of CO and/or $CO_2$ to form methane will serve to reduce these amounts.

According to some embodiments, the desired balancing of biomass oxygen conversion to liquid and gaseous products may be achieved using moderate reaction conditions, such as moderate levels of pressure and/or hydrogen partial pressure in the hydropyrolysis and/or hydroconversion reactors, as moderate levels of pressure and/or hydrogen partial pressure have been found to result in relatively greater yields of CO and $CO_2$, at the expense of $H_2O$, compared to the use of higher levels of pressure and/or hydrogen partial pressure in conventional hydroprocessing operations (e.g., conventional hydrotreating and/or hydrocracking of petroleum fractions). Representative pressures and/or hydrogen partial pressures in the hydropyrolysis and hydroconversion reactors (expressed as gauge pressures) may be independently less than about 55 barg (798 psig) (e.g., from about 7 barg (102 psig) to about 55 barg (798 psig), from about 14 barg (203 psig) to about 41 barg (595 psig), or from about 21 barg (305 psig) to about 38 barg (551 psig)).

According to some embodiments, it may be desirable for the hydropyrolysis reactor pressure to be substantially the same as that of the hydroconversion reactor, for example in the case in which the hydropyrolysis reactor vessel is operated at a pressure only slightly above that of the hydroconversion reactor vessel (e.g., at most about 3.5 bar (51 psi) above, or at most about 2 bar (29 psi) above), as needed to at least overcome the pressure differential between these vessels during normal operation.

Processes for Producing Activated Carbon from Hydropyrolysis Char

As described above, embodiments of the invention relate to processes for producing activated carbon, which benefit from important properties of hydropyrolysis char that result from subjecting a solid biomass-containing feedstock or solid biomass-derived feedstock to the volatilizing and stabilizing environment of hydropyrolysis. This environment includes the elevated temperatures, pressures, and hydrogen partial pressures as described above, in addition to the presence of a deoxygenating catalyst. Hydropyrolysis char is superior in many respects to coal as a starting material for producing activated carbon, both in terms of its overall quality and in terms of its environmental impact. In producing activated carbon, hydropyrolysis char (e.g., following its separation from a hydropyrolysis reactor output as described above) may be contacted with steam under conditions of temperature and residence time suitable for increasing its surface area from less than about 5 m$^2$/g (e.g., in the range from about 0.5 m$^2$/g to about 4.5 m$^2$/g) to at least about 300 m$^2$/g, for example from about 350 m$^2$/g to about 1500 m$^2$/g, typically at least about 400 m$^2$/g, for example from about 450 m$^2$/g to about 1150 m$^2$/g, and often at least about 400 m$^2$/g, for example from about 600 m$^2$/g to about 1000 m$^2$/g. The surface area obtained for the activated carbon is a function of not only the initial surface area of the hydropyrolysis char, but also the steam activation conditions, including temperature, steam partial pressure, and residence time. The surface area of activated carbon, as well as hydropyrolysis char, may be determined according to the Brunauer, Emmett and Teller (BET) method based on nitrogen adsorption (ASTM D1993-03(2008)).

This substantial increase in surface area is the result of the high porosity achieved in the steam activation, whereby the resulting activated carbon typically has a combined carbon meso- and micro-pore volume (i.e., pore volume of pores having diameters of less than or equal to 50 nm) of at least about 0.2 cc/g, for example in the range from about 0.2 cc/g to about 0.8 cc/g, and often at least about 0.4 cc/g, for example in the range from about 0.4 cc/g to about 0.7 cc/g. The pore volume of activated carbon, as well as hydropyrolysis char, may be determined by mercury intrusion porosimetry, according to ASTM D4284-07.

Hydropyrolysis char is also a significantly "cleaner" starting material for activated carbon production, compared to coal. In fact, common impurities in mined carbon sources are not only detrimental to the performance of activated carbon (e.g., in terms of its adsorptive capacity), but also pose environmental and health concerns associated with their disposal. Depending on its source, coal may contain total, combined amounts of mercury (Hg), selenium (Se), beryllium (Be), cadmium (Cd), arsenic (As), and chromium (Cr) of 25 parts per million by weight (wt-ppm) or more. In contrast, hydropyrolysis char and activated carbon produced therefrom generally have a total content of these elements of less than about 5 wt-ppm, typically less than about 1 wt-ppm, and often less than about 0.5 wt-ppm. With respect to mercury, which poses significant health concerns associated with the combustion of coal, hydropyrolysis char and activated carbon produced therefrom generally have a total content of this element of less than about 10 parts per billion by weight (wt-ppb), and typically less than about 5 wt-ppb. This is in contrast to a typical mercury content of about 100 wt-ppb for coal. Amounts of these trace elements may be determined by inductively coupled plasma atomic emission spectrometry (ICP-AES), according to ASTM D5600-09.

The ash content of a solid combustible material refers to the percentage by weight of a sample of such material that does not combust at a temperature of 750° C. (1382° F.). The ash content may be determined by a straightforward combustion method, for example
ASTM 3174, in which the sample is burned thoroughly under specified conditions, and the yield of the resulting, non-combustible ash is expressed as a percentage of the original weight. In the case of coal, a typical range with respect to its ash content is 5-25w % by weight (wt- %), whereas hydropyrolysis char and activated carbon produced therefreom have an ash content of generally less than about 5 wt- % and typically less than about 1 wt- %. Likewise, volatile matter of a solid combustible material may be measured according to ASTM D3175, for determining the percentage of volatile products, exclusive of moisture vapor, released during heating of the material under rigidly controlled conditions. This method is used as a basis for the classification of various coal types. As a result of having been subjected to conditions of hydropyrolysis, described above, hydropyrolysis char has a typical range of volatile products of less than about 3 wt- %, and often less than about 1 wt- %. Again, this contrasts sharply with coal, having significantly higher amounts of volatile products.

Finally, as described above, all or substantially all (e.g., generally at least about 80%, but often at least about 99%) of the carbon in hydropyrolysis char, in addition to the carbon of activated carbon made therefrom, is renewable carbon (e.g., derived from biomass). Moreover, in the steam activation process all or substantially all (e.g., generally at least about 80%, but often at least about 99%) of the atomic oxygen content of the steam used may be derived from biomass, thereby beneficially lowering the carbon footprint associated with activated carbon production, according to methods described herein.

EXAMPLE

The following example is set forth as representative of certain aspects and advantages relating to the present disclosure. This example is not to be construed as limiting the scope of the invention, as other equivalent embodiments will be apparent in view of the present disclosure and appended claims.

Activated carbon is a valuable product. For example, high-grade activated carbon made from wood (as opposed to coal, which contains heavy metals) is valued in the market place currently at about $1,250-$2,000/ton (Source: Shanghai Jinhu Activated Carbon Co. Ltd., Oct. 15, 2015). Solid carbonaceous char is a product of hydropyrolysis processes, including those described herein, which convert biomass (such as wood) into substantially fully deoxygenated liquid hydrocarbons such as gasoline and diesel fuel, as well as light hydrocarbons such as propane and methane. If the char is not treated in order to convert it to activated carbon, it is valued mainly on the basis of its energy content (about $600/ton). The economic impact associated with the conversion of hydropyrolysis char to activated carbon is significant, considering approximately 18% by weight of a typical biomass-containing or biomass-derived feedstock is converted into char, on a moisture- and ash-free feedstock basis. By increasing the commercial value of the char produced from hydropyrolysis, without significantly increasing the capital and/or operating costs, the rate of return associated with a commercial, integrated hydropyrolysis facility can be improved dramatically. The present disclosure makes this possible.

Overall, broad embodiments of the present disclosure relate to hydropyrolysis processes involving the co-production of activated carbon. Other embodiments relate to processes for the production of activated carbon from hydropyrolysis char. Certain aspects are associated with the advantages gained from these processes, in terms of operating synergies, intermediate material and end product properties, environmental impact, and economic attractiveness. Those having skill in the art, with the knowledge gained from the present disclosure, will recognize that various changes could be made to these processes in attaining these and other advantages, without departing from the scope of the present disclosure. As such, it should be understood that the features of the disclosure are susceptible to modification, alteration, changes, or substitution without departing from the scope of this disclosure. The specific embodiments illustrated and described herein are for illustrative purposes only, and not limiting of the invention as set forth in the appended claims.

What is claimed is:

1. A hydropyrolysis process, comprising:
    (a) feeding both (i) hydrogen and (ii) a biomass-containing feedstock or a biomass-derived feedstock, to a hydropyrolysis reactor vessel, under hydropyrolysis conditions for hydropyrolyzing the biomass-containing feedstock or the biomass-derived feedstock;
    (b) withdrawing from the hydropyrolysis reactor vessel a hydropyrolysis reactor output comprising solid char particles, at least one non-condensable gas, and a partially deoxygenated hydropyrolysis product;
    (c) separating at least a portion of the solid char particles, as hydropyrolysis char, from the hydropyrolysis reactor output;
    (d) contacting the hydropyrolysis char, separated in step (c), with steam to provide an activated carbon having a surface area of at least about 300 square meters per gram ($m^2/g$) and to further provide an activation effluent gas; and
    (e) reforming methane present in the activation effluent gas to generate at least a portion of the hydrogen in step (a).

2. The process of claim 1, wherein, in step (b), the hydropyrolysis reactor output is withdrawn from the hydropyrolysis reactor vessel as a vapor stream having the solid char particles entrained therein.

3. The process of claim 1, wherein, in step (c), the solid char particles are separated using a mechanical gas-solid separation device selected from the group consisting of a filter, a cyclone separator, an electrostatic precipitator, and combinations thereof.

4. The process of claim 1, wherein, in step (d), the hydropyrolysis char is contacted with steam in a steam activation vessel, wherein the steam is present in a fluidizing activation gas.

5. The process of claim 4, wherein conditions in the steam activation vessel include an activation temperature of at least about 500° C. (932° F.) and a residence time of at least about 30 minutes.

6. The process of claim 4, further comprising:
    (e) feeding a hydropyrolysis reactor vapor, obtained from the hydropyrolysis reactor output following the separation of the solid char particles in step (c), to a hydroconversion reactor vessel;
    (f) hydroconverting at least a portion of the hydropyrolysis reactor vapor in a hydroconversion zone to obtain a hydroconversion zone output;
    (g) recovering, by condensing a substantially fully deoxygenated hydrocarbon liquid from the hydroconversion zone output, a hydroconversion gaseous mixture; and
    (h) introducing at least a portion of the hydroconversion gaseous mixture to a steam reformer that provides a net production of hydrogen, together with unconsumed steam, in a steam reformer effluent;
    wherein the fluidizing activation gas comprises at least a portion of the steam reformer effluent.

7. The process of claim 6, further comprising:
    (i) withdrawing, from the steam activation vessel, an activation effluent gas that is enriched in hydrogen, relative to the fluidizing activation gas.

8. The process of claim 7, wherein hydrogen fed to the hydropyrolysis reactor vessel in step (a) or a separate source of hydroconversion hydrogen fed to the hydroconversion reactor vessel in step (f) includes hydrogen in the activation effluent gas.

9. The process of claim 8, further comprising:
    (j) condensing the steam in the activation effluent gas to provide a steam-depleted activation effluent vapor fraction, and
    (k) feeding the activation effluent vapor fraction to the steam reformer, wherein at least a portion of the net production of hydrogen in step (h) is obtained by reforming of methane in the steam-depleted activation effluent vapor fraction.

10. The process of claim 6, wherein the hydropyrolyzing in step (a) and the hydroconverting in step (f) are net exothermic process steps resulting in the generation of both hydropyrolysis reaction heat and hydroconversion reaction heat, and wherein at least a portion of the hydropyrolysis reaction heat or the hydroconversion reaction heat at least partially satisfies a heat requirement for providing the activated carbon in step (d).

11. The process of claim 6, wherein the unconsumed steam in the steam reformer effluent satisfies a steam requirement for providing the activated carbon in step (d).

12. The process of claim 6, further comprising fractionating the substantially fully deoxygenated hydrocarbon liquid, to obtain a gasoline fraction comprising gasoline boiling-range hydrocarbons and/or a diesel fuel fraction comprising diesel fuel boiling-range hydrocarbons, wherein, in step (d), activated carbon is provided substantially without adding to the carbon footprint of the gasoline fraction and/or the diesel fuel fraction, based on a lifecycle assessment (LCA) of greenhouse gas (GHG) emissions.

13. A process for producing activated carbon, the process comprising contacting hydropyrolysis char with steam to provide an activated carbon having a surface area of greater than about 300 square meters per gram ($m^2/g$), and to further provide an activation effluent gas, the process further comprising
    reforming methane present in the activation effluent gas to generate hydrogen.

14. The process of claim 13, wherein the hydropyrolysis char has a surface area of less than about 5 $m^2/g$.

15. The process of claim 13, wherein the hydropyrolysis char has a total content of Hg, Se, Be, Cd, As, and Cr of less than 5 parts per million by weight (wt-ppm).

16. The process of claim 13, wherein the hydropyrolysis char has a content of mercury of less than about 10 parts per billion by weight (wt-ppb).

17. The process of claim 13, wherein substantially all carbon in the hydropyrolysis char is obtained from biomass.

18. The process of claim 13, wherein substantially all of the atomic oxygen content of the steam is biomass oxygen.

19. The process of claim 13, wherein the hydropyrolysis char has an ash content of less than about 1% by weight.

* * * * *